(12) United States Patent
Bazzi et al.

(10) Patent No.: US 8,607,505 B2
(45) Date of Patent: *Dec. 17, 2013

(54) SEALING ASSEMBLY FOR A VEHICLE

(75) Inventors: Imad F. Bazzi, Rochester Hills, MI (US); Ronald P. McKenney, Rochester, MI (US); James S. Netherland, III, Clarkston, MI (US); Raymond R. Lipowski, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 471 days.

This patent is subject to a terminal disclaimer.

(21) Appl. No.: 12/844,068

(22) Filed: Jul. 27, 2010

(65) Prior Publication Data

US 2012/0023830 A1 Feb. 2, 2012

(51) Int. Cl.
  *E06B 7/16* (2006.01)
(52) U.S. Cl.
  USPC ............ 49/368; 49/366; 49/367; 49/498.1; 49/476.1; 296/146.9
(58) Field of Classification Search
  USPC ........... 49/366–368, 116, 475.1, 480, 498.1, 49/476.1; 296/146.9, 202; 277/644, 277/645–646, 605; 312/296, 405
  See application file for complete search history.

(56) References Cited

U.S. PATENT DOCUMENTS

| | | | | |
|---|---|---|---|---|
| 2,767,040 A * | 10/1956 | Kesling | | 312/296 |
| 2,997,336 A * | 8/1961 | Grant | | 296/106 |
| 4,428,153 A * | 1/1984 | Klinger et al. | | 49/366 |
| 4,711,098 A * | 12/1987 | Kuwabara et al. | | 62/441 |
| 5,791,723 A * | 8/1998 | Bell et al. | | 296/155 |
| 6,386,619 B1 * | 5/2002 | Tsuchida | | 296/146.9 |
| 7,000,976 B2 * | 2/2006 | Azzouz et al. | | 296/146.1 |
| 7,032,953 B2 * | 4/2006 | Rangnekar et al. | | 296/146.11 |
| 7,819,465 B2 * | 10/2010 | Elliott et al. | | 296/202 |
| 8,123,278 B1 * | 2/2012 | McKenney et al. | | 296/146.9 |
| 8,196,992 B2 * | 6/2012 | Konchan et al. | | 296/146.9 |
| 8,328,268 B2 * | 12/2012 | Charnesky et al. | | 296/146.9 |
| 8,328,269 B2 * | 12/2012 | Krajenke | | 296/146.9 |
| 8,342,592 B2 * | 1/2013 | Konchan et al. | | 296/146.1 |
| 2001/0017006 A1 * | 8/2001 | Saito | | 49/368 |
| 2002/0178656 A1 * | 12/2002 | Nozaki et al. | | 49/441 |
| 2005/0046319 A1 * | 3/2005 | Chekal et al. | | 312/401 |
| 2005/0194820 A1 * | 9/2005 | Azzouz et al. | | 296/193.05 |
| 2006/0236802 A1 * | 10/2006 | Sesita et al. | | 74/425 |
| 2009/0273264 A1 * | 11/2009 | Butler | | 312/405 |

FOREIGN PATENT DOCUMENTS

DE 102008005490 A1 7/2009

* cited by examiner

*Primary Examiner* — Katherine Mitchell
*Assistant Examiner* — Marcus Menezes
(74) *Attorney, Agent, or Firm* — Quinn Law Group, PLLC

(57) ABSTRACT

A sealing assembly is provided for a vehicle having independently opening and closing closure panels, such as first and second doors, which are hinged to a vehicle body with opposing hinges. The sealing assembly has a first seal that is mounted to the vehicle body to substantially surround a continuous door opening, and has a first membrane portion that extends over a first portion of the cutline. A second seal is mounted to a surface of the first door that faces the first membrane portion when the first door is closed. A third seal is mounted to a surface of the second door that faces the first membrane portion when the second door is closed. The first membrane portion is configured to be movable toward the closed first and second doors into contact with the second and third seals to seal the first portion of the cutline.

15 Claims, 5 Drawing Sheets

US 8,607,505 B2

SEALING ASSEMBLY FOR A VEHICLE

TECHNICAL FIELD

The invention relates to a sealing assembly for a vehicle with front and rear closure panels, such as doors, having opposing hinges.

BACKGROUND

Vehicles having front and rear doors with opposing hinges on the same side of the vehicle and with no body pillar between the doors are typically designed so that the doors seal to one another, and are thus "dependent". That is, one vehicle door, usually the front door, must be opened before the rear door can be opened, and the rear door must then be closed before the front door can be closed. The doors are dependent so that one door can seal to the other door when the doors are closed, because there is no body pillar between the doors that the doors could otherwise seal to and be operated independently.

SUMMARY

A sealing assembly is provided for a vehicle having independently opening and closing closure panels, such as first and second doors, which are hinged to a vehicle body with opposing hinges so that the doors substantially cover a continuous door opening defined by the vehicle body. The first and second doors are "independently" openable and closable, which means that each can be opened or closed regardless of the position of the other vehicle door. The door opening is "continuous" as there is no body pillar, such as a B-pillar, between the vehicle doors. Both doors are therefore required to be closed to close out the continuous door opening as opposed to a typical arrangement in which one door closes a door opening. Thus, when the doors are closed, they both close out the door opening and form a cutline therebetween. The sealing assembly seals a portion of the cutline. A first seal, referred to herein as a body-mounted seal, is mounted to the vehicle body to substantially surround the continuous door opening and has a first membrane portion that extends over a first portion of the cutline. The sealing assembly includes a second seal mounted to a surface of the front door that faces the first membrane portion when the first door is closed. A third seal is mounted to a surface of the rear door that faces the first membrane portion when the second door is closed. The first membrane portion is configured to be movable toward the closed front and rear doors into contact with the second and third seals to seal the first portion of the cutline.

The above features and advantages and other features and advantages of the present invention are readily apparent from the following detailed description of the best modes for carrying out the invention when taken in connection with the accompanying drawings.

DETAILED DESCRIPTION

Figure 1:
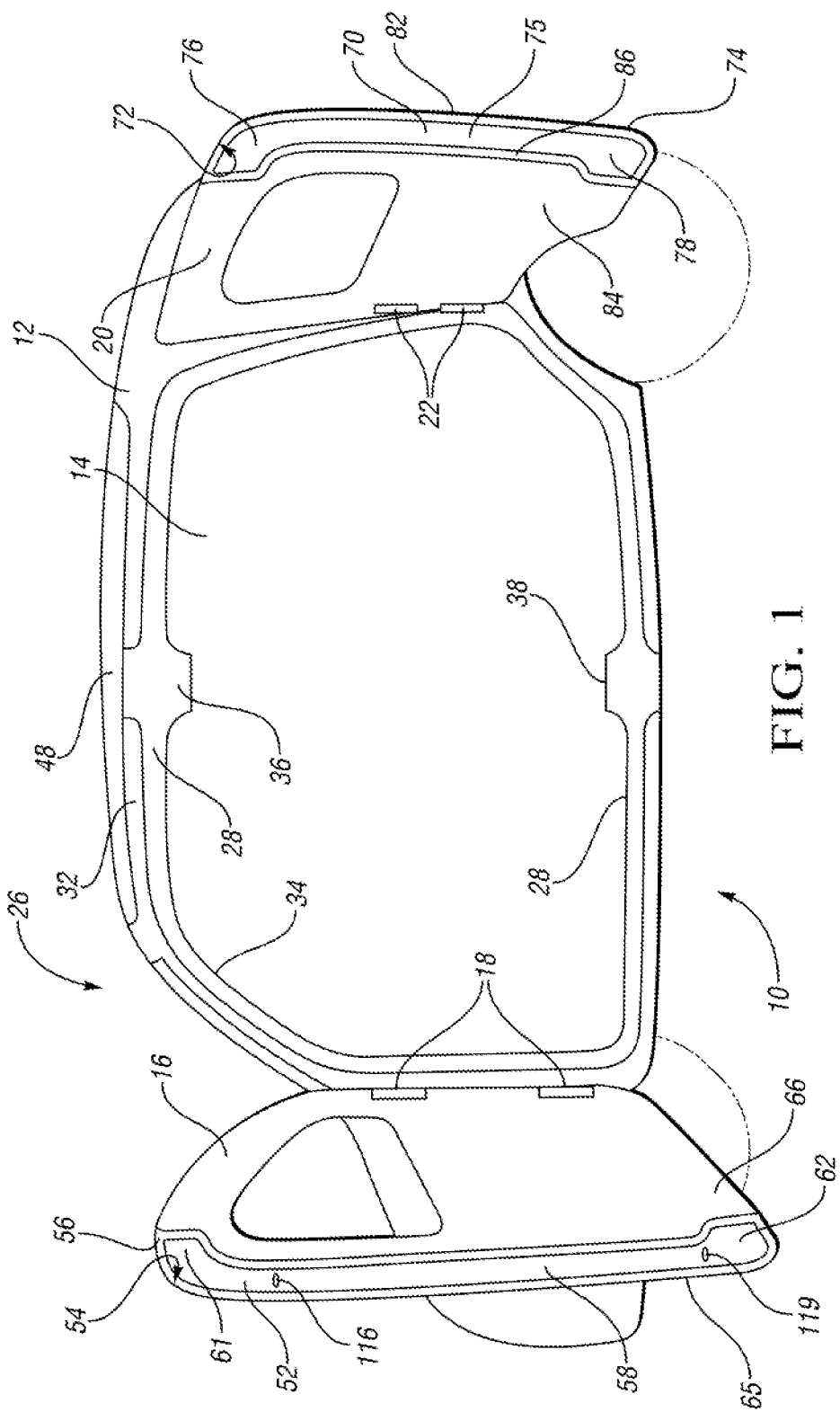
FIG. 1 is a schematic side view illustration of a vehicle having front and rear doors with opposing hinges and a sealing assembly with a first seal mounted to the vehicle body.
Figure 5:
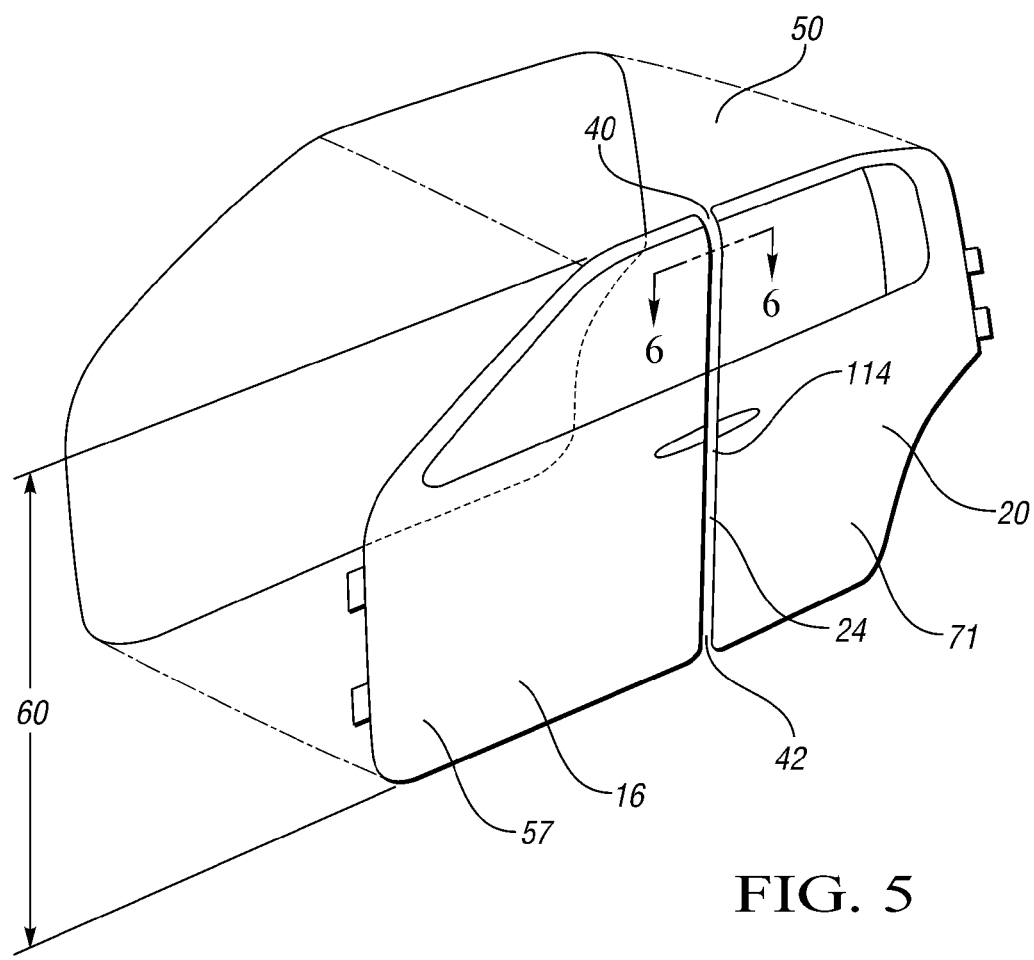
FIG. 5 is a schematic illustration of the vehicle body with doors in a closed position.

Referring to the drawings, wherein like reference numbers refer to like components throughout the several views, FIG. 1 shows a vehicle 10. A vehicle body 12 defines a continuous door opening 14. A front door 16, also referred to herein as a first door, is hinged to the vehicle body 12 with hinges 18. A rear door 20, also referred to herein as a second door, is hinged to the vehicle body 12 with hinges 22. The hinges are "opposing hinges" as the doors 16, 20 pivot open about the hinges 18, 22 in opposite directions. The front door 16 pivots forward to open, and the rear door 20 pivots rearward to open. The opposing hinges 18, 22 allow the door opening 14 to be continuous, with no B-pillar between the doors 16, 20. Because the doors 16, 20 are independently openable and closable (i.e., may be opened and closed in either order or simultaneously), when the doors 16, 20 are closed as shown in FIG. 5, they both close out the door opening 14 and form a cutline 24 between them. Although front and rear doors 16, 20 are shown, other closure panels, such as rear doors on a van or a sport utility vehicle, could be used within the scope of the claimed invention.

Figure 2:
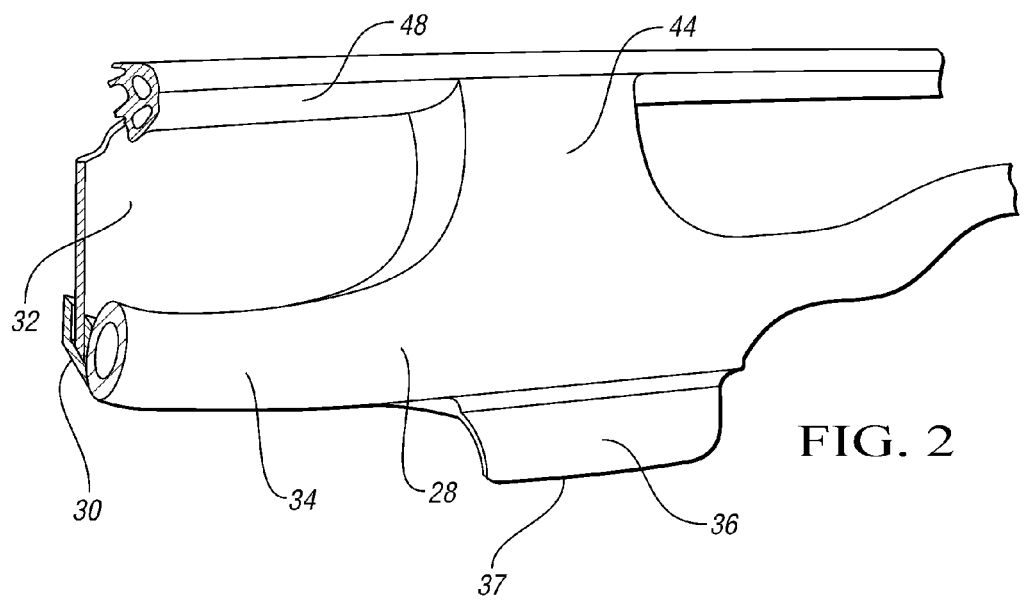
FIG. 2 is a schematic perspective illustration in fragmentary view showing a portion of the first seal mounted to the vehicle body and the membrane portion.
Figure 4:
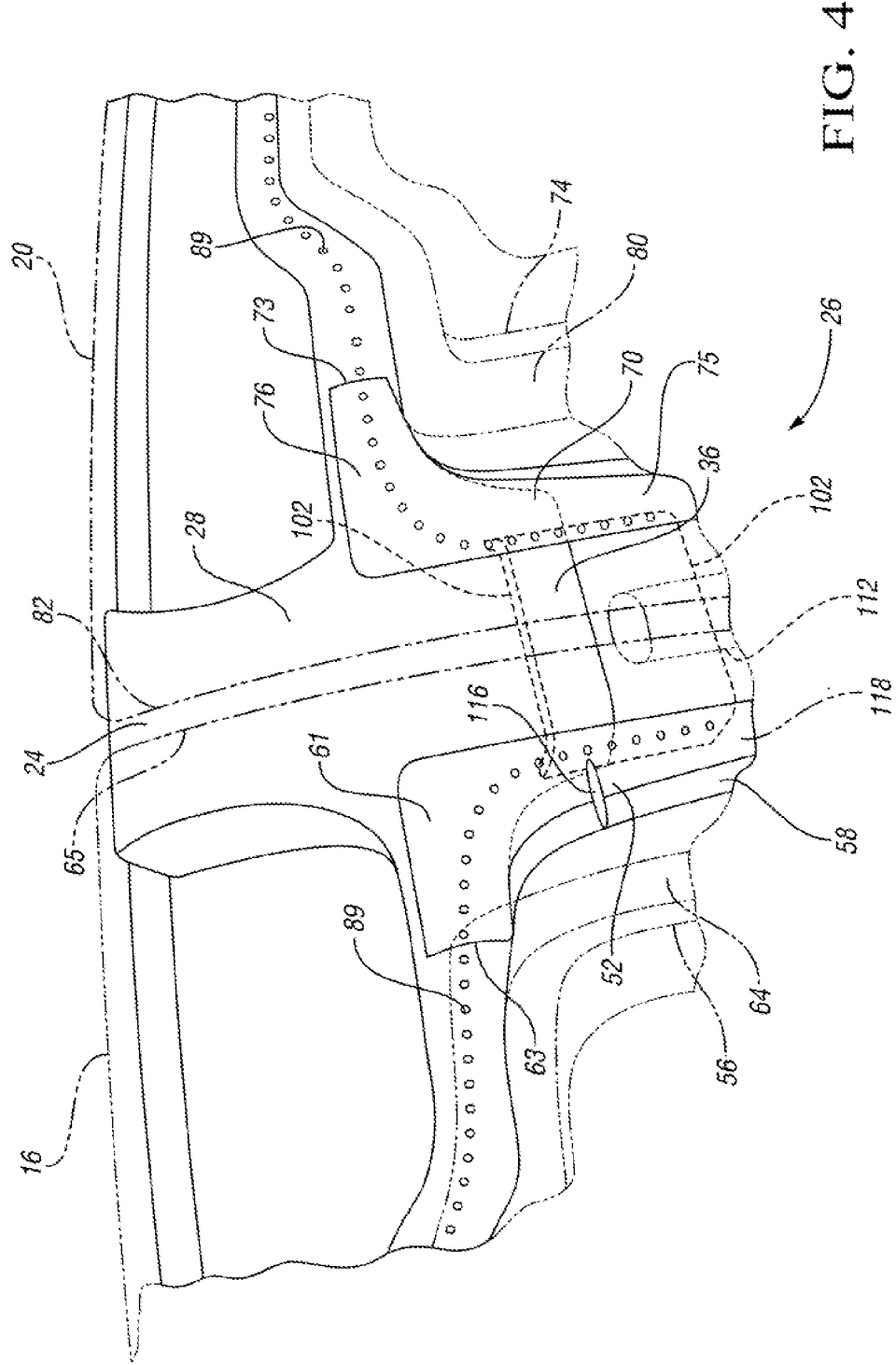
FIG. 4 is a schematic perspective illustration in fragmentary view showing both the front and rear inner door panels in phantom in closed positions with the retractable seal pushing the membrane portion outboard away from the vehicle body into contact with seals mounted on the front and rear doors.
Figure 6:
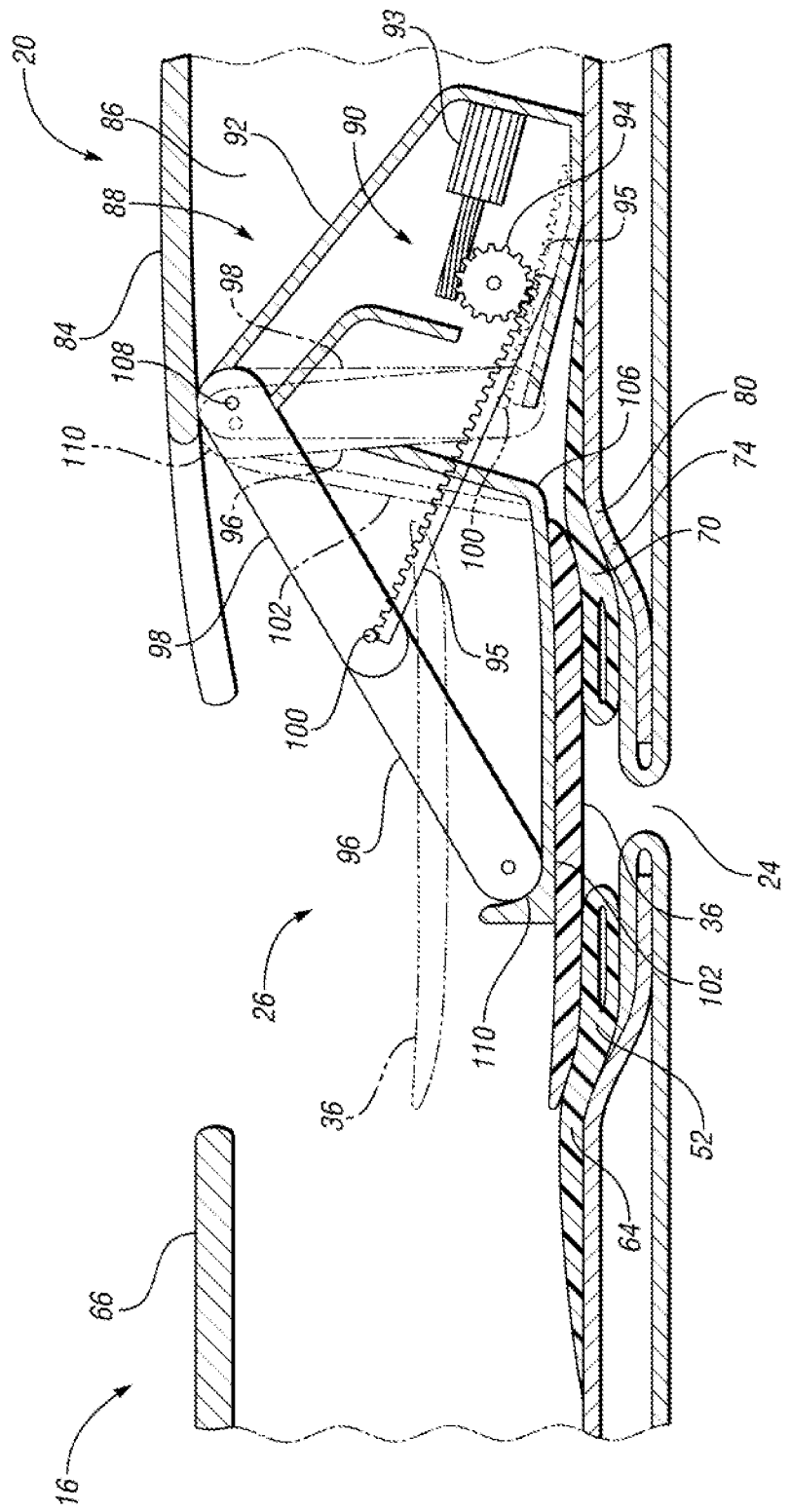
FIG. 6 is a schematic fragmentary cross-sectional illustration of the front and rear doors in a closed position taken at the arrows 6-6 in FIG. 5 with the retractable sealing surface module actuated to move the first membrane portion into contact with the door-mounted seals.

A sealing assembly 26, best shown in FIGS. 4 and 6, is provided that is able to seal portions of the cutline 24 without requiring a B-pillar and without requiring that the doors 16, 20 be "dependent". Referring to FIGS. 1 and 2, the sealing assembly 26 includes a body-mounted seal 28, referred to herein as a first seal. The body-mounted seal 28 includes a carrier portion 30, shown in FIG. 2, which secures the body-mounted seal 28 to a flange 32 of the vehicle body 12. The flange 32 defines the opening 14 and allows the body-mounted seal 28 to surround the opening 14. Specifically, a bulb portion 34 of the body-mounted seal 28 surrounds the opening 14. A bulb portion of a seal is a generally cylindrical portion that compresses under force to provide an adequate sealing surface between two components.

Referring again to FIG. 1, the body-mounted seal 28 also has a first membrane portion 36 and a second membrane portion 38 that extend from the bulb portion 34, and are flexible elastomeric flaps. Referring to FIGS. 1 and 5, the membrane portions 36, 38 are positioned so that the first membrane portion 36 extends over a first, upper portion 40 of the cutline 24 and the second membrane portion 38 extends over a second, lower portion of the cutline 24 when the doors 16, 20 are closed. The first membrane portion 36 tapers to a feathered edge 37 shown in FIG. 2. The second membrane portion 38 shown in FIG. 1 also has a similar feathered edge. The feathered edges improve the sealing capabilities of the membrane portions 36, 38. Referring to FIG. 2, the body-mounted seal 28 also has an extension portion 44 extending from the bulb portion 34 opposite the first membrane portion 36. The extension portion 44 interfaces with a separate weather seal 48 extending between the vehicle roof 50 (shown in FIG. 5) and the flange 32. The body-mounted seal 28 is configured in a symmetrical manner at the second membrane portion 38, with another extension portion extending from the bulb portion 34 opposite the second membrane portion 38, as shown but not labeled in FIG. 1.

Referring still to FIG. 1, the front door 16 has a seal 52, referred to herein as a second seal or a first closure panel seal, mounted to a surface 54 of a door panel 56 of the front door 16. When the front door 16 is closed, as shown in FIG. 4, surface 54 (shown in FIG. 1) faces the membrane portion 36 so that the seal 52 is positioned to be in contact with the membrane portion 36 when it is moved outboard, away from the vehicle body 12. As used herein, "outboard" means away from a longitudinal centerline of the vehicle 10. An outer door panel 57 shown in FIG. 5 is outboard of both the seal 52 and the door panel 56.

As best shown in FIGS. 1 and 4, the seal 52 has a bulb portion 58 that extends substantially along a length 60 of the cutline 24, shown in FIG. 5. In FIG. 4, for clarity in the drawings, door panels 56, 74 of the doors 16, 20 are shown in phantom although they are outboard of the seals 58, 70, outboard of the membrane portion 36, and outboard of the sealing surface 102 and bulb seal 112 described below. An upper end portion 61 and a lower end portion 62 of the seal 52 have feathered edges that taper onto the inner surface 54. The feathered edge 63 of the upper end portion 61 is shown in FIG. 4. As shown in FIG. 4, the seal 52 is nested between a ridge 64 formed by the door panel 56 and an edge 65 of the door 16 defining the cutline 24. Referring to FIG. 1, a trim panel 66 covers a majority of the door panel 56 that faces inward when the door 16 is closed.

Figure 3:
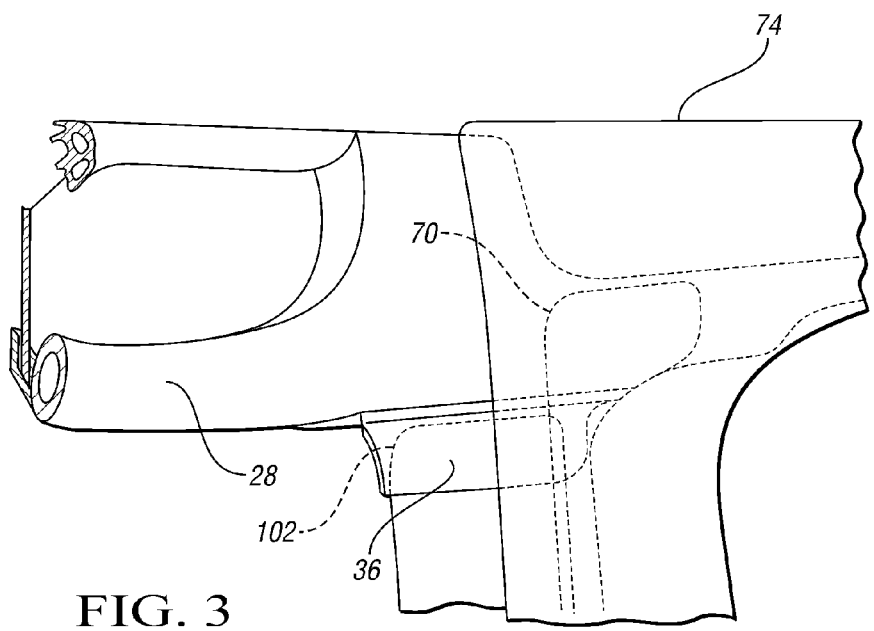
FIG. 3 is a schematic perspective illustration in fragmentary view showing the rear door in a closed position and indicating movement of a retractable sealing surface module from a position inside the rear door to a position in which a retractable sealing surface pushes the membrane portion outboard away from the vehicle body.

Referring to FIG. 1, the rear door 20 has a seal 70, referred to herein as a third seal or a second closure panel seal, mounted to a surface 72 of a door panel 74 of the rear door 20. When the rear door 20 is closed, as shown in FIG. 4, surface 72 faces the membrane portion 36 so that the seal 70 is positioned to be in contact with the membrane portion 36 when the membrane portion 36 is moved outboard, away from the vehicle body 12. As explained further with respect to FIG. 6 below, the membrane portion 36 is moved outward by a retractable surface seal module 88 when the rear door 20 is closed. In FIG. 3, the membrane portion 36 is outboard of a portion of a sealing surface 102 (shown in phantom) of the retractable surface seal module 88 of FIG. 6, described below. The door panel 74 is outboard of both the seal 28 and the seal 70, which are therefore shown in phantom where covered by the door panel 74.

As best shown in FIGS. 1 and 4, the seal 70 has a bulb portion 75 that extends substantially along a length 60 of the cutline 24, shown in FIG. 5. An upper end portion 76 and a lower end portion 78 of the seal 70 are feathered edges that taper into the surface 72. The feathered edge 73 of the upper end portion 76 is shown in FIG. 4. As also shown in FIG. 4, the seal 70 is nested between a ridge 80 formed by the inward-facing door panel 74 extending toward the vehicle body and an edge 82 of the door 20 defining the cutline 24. An outer door panel 71 of FIG. 5 is outboard of both the seal 70 and the door panel 74. Referring to FIG. 1, a trim panel 84 covers a majority of the door panel 74 that faces inward when the door 20 is closed.

A slot-like opening 86 is formed between the door panel 74 and the trim panel 84 as shown in FIG. 6. The retractable surface seal module 88, shown in FIG. 6, is packaged in the opening 86 between the trim panel 84 and the door panel 74 and is operable to move the first membrane portion 36 and the second membrane portion 38 outboard into contact with portions of the seals 52, 70, as shown in FIG. 4, to seal the portions 40, 42 of the cutline 24 shown in FIG. 5. A resulting sealing line 89 indicated by open circles is shown in FIG. 4. The feathered edges 63, 73 contribute to the integrity of the seal along sealing line 89. As shown in FIG. 6, a gap between the trim panels 66, 84 in the area of the first membrane portion 36 is wider than the first membrane portion 36, so that the first membrane portion can pass outboard of the respective trim panels 66, 84 when the respective doors 16, 20 are closed. For example, if the front door 16 is closed prior to the rear door 20, the first membrane portion 36 will be in the position shown in phantom in FIG. 6 relative to the front door 16 and will not interfere with the front door 16. If the rear door 20 is closed first, or when it is closed after the front door 16, the first membrane portion 36 moves from the initial position shown in phantom to the position shown in solid in FIG. 6 due to operation of the retractable surface seal module 88 described below.

As shown in FIG. 6, retractable surface seal module 88 includes an actuator 90 packaged in an actuator housing 92. An electric motor 93 is selectively energized, such as in response to a switch closing when the rear door 20 is closed, to cause a worm gear 94 to actuate linkage members 96, 98. Both linkage members 96, 98 are attached at a pivot point 100 to a rack 95 that moves linearly when the worm gear 94 rotates. Linkage member 98 has a fixed pivot point 108, and linkage member 96 has an end portion 110 that pushes against a sealing surface 102. The linkage members 96, 98 are shown in phantom in a nonactuated position. The sealing surface 102 is anchored at one end (near the pivot point 108) to any of the door trim panel 84, the door panel 74, or the actuator housing 92. The sealing surface 102 forms a living hinge 106 at a midportion of the sealing surface 102. The sealing surface 102 has a freely movable end biased in contact with the end portion 110. The retractable surface seal module 88 is packaged in the slot 86 at some height on the vehicle 10 of FIG. 1 that is between the first and second membrane portions 36, 38. Only uppermost and lowermost portions of the sealing surface 102 are positioned to be aligned with the membrane portions 36, 38, respectively. Accordingly, the linkage members 96, 98, actuator housing 92, motor 93, worm gear 94, and rack 95 are below the cross-section of FIG. 6.

When the motor 93 is energized, the rack 95 moves the linkage members 96, 98 to the positions shown in solid in FIG. 6, with the end portion 110 moving forward and outward on the vehicle 10. The linkage members 96, 98 move through an opening in the sealing surface 102 below the cross-sectional portion shown. The sealing surface 102 pushes the first membrane portion 36 outboard into contact with the seal 70, compressing the seal 70 between the first membrane portion 36 and the door panel 74 between the ridge 80 and the edge 82 of the door panel 74 at the cutline 24. If the front door 16 has already been closed, the first membrane portion 36 will also be pushed into contact with the seal 58, compressing the seal 58 between the first membrane portion 36 and the door panel 56 between the ridge 64 and the edge 65. Alternatively, the door 16 can be closed after the door 20, in which case the seal 58 will also be compressed by the first membrane portion 36 via the already-actuated sealing surface 102. The doors 16, 20 can also be opened from the closed positions of FIG. 6 in either order. If the rear door 20 is opened prior to opening of the front door 16, a switch closing a circuit to the motor 93 will be open, and another switch will be closed, causing the motor 93 to rotate in the opposite direction, moving the rack 95 to retract the linkage members 96, 98 into the opening 86

(back to the position shown in phantom in FIG. 6), allowing the rear door 20 to open without the seal module 88 interfering with the front door 16. Any actuator that is configured to move the sealing surface 102 in the required manner may be used.

The retractable surface seal module 88 operates in like manner with respect to the second membrane portion 38 to seal the second membrane portion 38 against the seals 58, 70. A bulb seal 112 extends from the sealing surface 102 to a like sealing surface for the second membrane portion 38 to seal the midportion 114 of the cutline 24 between the upper portion 40 and lower portion 42 of FIG. 5. By moving the first and second membrane portions 36, 38 outboard to accomplish the body to door sealing, variations in door to body fit, that could otherwise cause leaks if relying on the interface of only non-movable seals, do not interfere with proper sealing, and leaks are prevented.

Referring again to FIG. 4, the bulb portion 58 of seal 52 is formed with an opening 116 that allows water collected between the seal 28 and the seal 52 to drain through a passage 118 extending through the bulb seal 58 and out of another opening 119 (shown only in FIG. 1) positioned toward the bottom of seal 52. Thus, water is drained outboard of the sealing surface 102 and the bulb seal 112. The seal 70 may have a like opening in addition to or in lieu of the opening 116.

While the best modes for carrying out the invention have been described in detail, those familiar with the art to which this invention relates will recognize various alternative designs and embodiments for practicing the invention within the scope of the appended claims.

The invention claimed is:

1. A sealing assembly for a vehicle having first and second doors that are hinged to a vehicle body with opposing hinges so that both of the doors substantially cover a door opening formed by the vehicle body and form a cutline therebetween when closed, the sealing assembly comprising:
   a first seal mounted to the vehicle body to substantially surround the door opening and having a first membrane portion that extends over a first portion of the cutline;
   wherein the first and second doors are independently openable and closable;
   a second seal mounted to a surface of the first door that faces the first membrane portion when the first door is closed;
   a third seal mounted to a surface of the second door that faces the first membrane portion when the second door is closed; and
   wherein the first membrane portion is configured to be movable toward the closed first and second doors and into contact with the second and third seals so that the first membrane portion and the second and third seals seal the first portion of the cutline;
   wherein the third seal is on a surface of a door panel of the second door; wherein the surface of the door panel of the second door faces inward on the vehicle when the second door is closed;
   wherein the second door includes a trim panel positioned inward of the door panel when the second door is closed; wherein an opening is defined by the trim panel and the door panel between the door panel and the trim panel; and further comprising:
   an electric motor;
   a worm gear operatively connected to the electric motor and configured to rotate when the electric motor is energized;
   a rack meshing with the worm gear and moved by the worm gear when the worm gear rotates;
   a member having a sealing surface; and
   linkage members operatively connected to the rack and configured to move the member having the sealing surface into contact with the first membrane portion to move the first membrane portion when the motor is energized.

2. The sealing assembly of claim 1, wherein the first portion of the cutline is an upper portion of the cutline; and wherein the first seal further includes a second membrane portion that extends over a lower portion of the cutline when the doors are closed and is configured to be movable toward the closed first and second doors into contact with the second and third seals to seal the lower portion of the cutline.

3. The sealing assembly of claim 1, wherein the first seal includes a bulb portion that is operatively connected to a flange of the vehicle body; wherein the flange and the bulb portion substantially surround the door opening; and wherein the first membrane portion extends from the bulb portion.

4. The sealing assembly of claim 1, wherein the first membrane portion has a feathered edge.

5. The sealing assembly of claim 1, wherein the second seal is on a surface of a door panel of the first door; wherein the surface of the door panel of the first door faces inward on the vehicle when the first door is closed.

6. The sealing assembly of claim 5, wherein the second seal extends alongside the cutline substantially along the length of the cutline.

7. The sealing assembly of claim 5, wherein the door panel of the first door forms a ridge extending toward the vehicle body when the first door is closed; and wherein the second seal is between the ridge and the cutline.

8. The sealing assembly of claim 1, wherein the third seal extends alongside the cutline substantially along the length of the cutline.

9. The sealing assembly of claim 1, wherein the door panel of the second door forms a ridge extending toward the vehicle body when the second door is closed; and wherein the third seal is between the ridge and the cutline.

10. The sealing assembly of claim 1, wherein at least one of the second and third seals is a bulb seal with a passage and has an opening positioned to allow water to drain through the opening and passage.

11. The sealing assembly of claim 1, wherein at least one of the second and third seals tapers to a feathered edge.

12. A sealing assembly for a vehicle, having first and second doors that are hinged to a vehicle body with hinges arranged so that both of the doors substantially cover a door opening formed by the vehicle body and form a cutline therebetween when closed, the sealing assembly comprising:
   a first seal mounted to the vehicle body and having a bulb portion that substantially surrounds the door opening and having a first membrane portion that extends from the bulb portion over a first portion of the cutline;
   a second seal mounted to a surface of the first door that faces the first membrane portion when the first door is closed; wherein at least a portion of the second seal is nested between a ridge on the first door and the cutline;
   a third seal mounted to a surface of the second door that faces the first membrane portion when the second door is closed; wherein at least a portion of the third seal is nested between another ridge on the second door and the cutline; wherein the first and second doors are independently openable and closable;
   wherein the first membrane portion is configured to be movable toward the closed first and second doors into contact with the second and third seals between the ridges to seal the first portion of the cutline;

wherein the second door includes a door panel on which the third seal is mounted; wherein the second door includes a trim panel positioned inward of the door panel on the vehicle when the second door is closed; wherein an opening is defined by the trim panel and the door panel between the door panel and the trim panel; and further comprising:

an electric motor;

a worm gear operatively connected to the electric motor and configured to rotate when the electric motor is energized;

a rack meshing with the worm gear and moved by the worm gear when the worm gear rotates;

a member having a sealing surface; and linkage members operatively connected to the rack and configured to move the member having the sealing surface into contact with the first membrane portion to move the first membrane portion when the motor is energized.

13. The sealing assembly of claim 12, wherein at least one of the second and third seals is a bulb seal with a passage and has an opening positioned to allow water to drain through the opening and passage.

14. The sealing assembly of claim 12, wherein the first membrane portion has a feathered edge.

15. A sealing assembly for a vehicle, having first and second closure panels that are hinged to a vehicle body with hinges arranged so that both of the closure panels substantially cover an opening formed by the vehicle body and form a cutline therebetween when closed, the sealing assembly comprising:

a first closure panel seal mounted to the first closure panel and extending along an inboard-facing surface of the first closure panel adjacent an edge of the first closure panel that defines the cutline;

a second closure panel seal mounted to the second closure panel and extending along an inboard-facing surface of the second closure panel adjacent an edge of the second closure panel that defines the cutline; wherein the first and second closure panels are independently openable and closable;

another seal mounted to the vehicle body and substantially surrounding the opening and having a first membrane portion that extends over a first portion of the cutline; wherein the first membrane portion is configured to be movable outboard into contact with both the first and second closure panel seals to cover the first portion of the cutline;

wherein a trim panel is operatively connected to the second closure panel and is positioned inward of the second closure panel on the vehicle when the second closure panel is closed; wherein an opening is defined by the trim panel and the second closure panel between the second closure panel and the trim panel; and further comprising:

an electric motor;

a worm gear operatively connected to the electric motor and configured to rotate when the electric motor is energized;

a rack meshing with the worm gear and moved by the worm gear when the worm gear rotates;

a member having a sealing surface; and linkage members operatively connected to the rack and configured to move the member having the sealing surface into contact with the first membrane portion to move the first membrane portion when the motor is energized.

* * * * *